(12) United States Patent
Toma

(10) Patent No.: US 10,933,894 B2
(45) Date of Patent: Mar. 2, 2021

(54) SYSTEM FOR LOADING AND UNLOADING MOVING VEHICLES

(71) Applicant: Mircea Toma, Saint Paul, MN (US)

(72) Inventor: Mircea Toma, Saint Paul, MN (US)

( * ) Notice: Subject to any disclaimer, the term of this patent is extended or adjusted under 35 U.S.C. 154(b) by 0 days.

(21) Appl. No.: 15/130,938

(22) Filed: Apr. 16, 2016

(65) Prior Publication Data

US 2020/0095075 A1    Mar. 26, 2020

(51) Int. Cl.
*B61K 1/00* (2006.01)
*B65G 67/22* (2006.01)
*B61D 47/00* (2006.01)
*B65G 67/20* (2006.01)

(52) U.S. Cl.
CPC ............... *B61K 1/00* (2013.01); *B61D 47/00* (2013.01); *B65G 67/20* (2013.01); *B65G 67/22* (2013.01)

(58) Field of Classification Search
CPC ........ B61D 47/00; B61D 47/005; B61D 3/18; B61K 1/00; B62D 35/00; B62D 37/02; Y02T 30/32; B65G 63/004; B65G 63/025; B65G 67/22
See application file for complete search history.

(56) References Cited

U.S. PATENT DOCUMENTS

| | | | | |
|---|---|---|---|---|
| 3,416,684 A | * | 12/1968 | Barry | B61K 1/00 414/499 |
| 3,734,025 A | * | 5/1973 | Shoemaker | B61J 1/10 104/20 |
| 3,823,671 A | * | 7/1974 | Straumsnes | B61D 39/00 104/18 |
| 4,065,006 A | * | 12/1977 | Barry | B61B 1/005 414/334 |
| 4,093,084 A | * | 6/1978 | Ringer | B65G 17/345 104/88.02 |
| 4,688,841 A | * | 8/1987 | Moore | B62D 35/001 296/180.4 |
| 5,407,245 A | * | 4/1995 | Geropp | B61D 17/02 296/180.1 |

(Continued)

FOREIGN PATENT DOCUMENTS

| | | | | |
|---|---|---|---|---|
| DE | 3502226 A1 | * | 7/1986 | ........... B61D 3/18 |
| WO | WO-9925582 A2 | * | 5/1999 | ........... B60P 1/6436 |

*Primary Examiner* — Zachary L Kuhfuss
(74) *Attorney, Agent, or Firm* — Mitchell Hamline IP Clinic

(57) ABSTRACT

The present disclosure is directed to a system for non-stop high-speed rail transportation having a high-speed rail car with a movable cabin, and a high-speed rail shuttle reaching a speed equivalent to that of the high-speed rail car. The system also includes a mechanical coupling between the high-speed rail car and the high-speed rail shuttle, and a transfer platform system supporting a transfer of the movable cabin from the high-speed rail car to the high-speed rail shuttle.

The present disclosure is also directed to a method of non-stop high-speed rail transportation including operating a high-speed rail car at a high-speed and a high-speed rail shuttle at the high-speed alongside the high-speed rail car. The method also includes coupling the high-speed rail car to the high-speed rail shuttle, transferring a movable cabin from the high-speed rail car to the high-speed rail shuttle, and decoupling the high-speed rail shuttle from the high-speed rail shuttle.

4 Claims, 11 Drawing Sheets

(56) References Cited

U.S. PATENT DOCUMENTS

| | | | | |
|---|---|---|---|---|
| 6,038,980 | A * | 3/2000 | Bittar | B61K 1/00 |
| | | | | 104/20 |
| 6,302,635 | B1 * | 10/2001 | Kolker | B60P 1/6436 |
| | | | | 414/341 |
| 6,321,659 | B1 * | 11/2001 | Gelbert | B61D 17/02 |
| | | | | 105/1.1 |
| 6,619,904 | B1 * | 9/2003 | Barry | B61D 47/00 |
| | | | | 414/337 |
| 6,652,214 | B1 * | 11/2003 | Barry | B61D 47/00 |
| | | | | 414/334 |
| 6,695,561 | B2 * | 2/2004 | Barry | B61D 47/00 |
| | | | | 414/333 |
| 7,261,353 | B2 * | 8/2007 | Storms | B61D 49/00 |
| | | | | 105/355 |
| 7,779,761 | B2 * | 8/2010 | Barry | B61K 1/00 |
| | | | | 104/20 |
| 8,312,817 | B2 * | 11/2012 | Barry | B60P 3/34 |
| | | | | 104/20 |
| 8,746,153 | B2 * | 6/2014 | Barry | B61D 3/20 |
| | | | | 104/20 |
| 9,010,253 | B2 * | 4/2015 | Barry | B61F 13/00 |
| | | | | 105/215.2 |
| 9,550,535 | B2 * | 1/2017 | Malone | B62D 35/001 |
| 10,189,515 | B2 * | 1/2019 | Malone | B62D 35/001 |
| 2013/0098263 | A1 * | 4/2013 | Barry | B61F 13/00 |
| | | | | 105/215.2 |
| 2014/0361579 | A1 * | 12/2014 | Alguera Gallego | |
| | | | | B62D 35/001 |
| | | | | 296/180.2 |
| 2017/0066486 | A1 * | 3/2017 | Malone | B62D 35/001 |
| 2020/0095075 | A1 * | 3/2020 | Toma | B65G 67/22 |

* cited by examiner

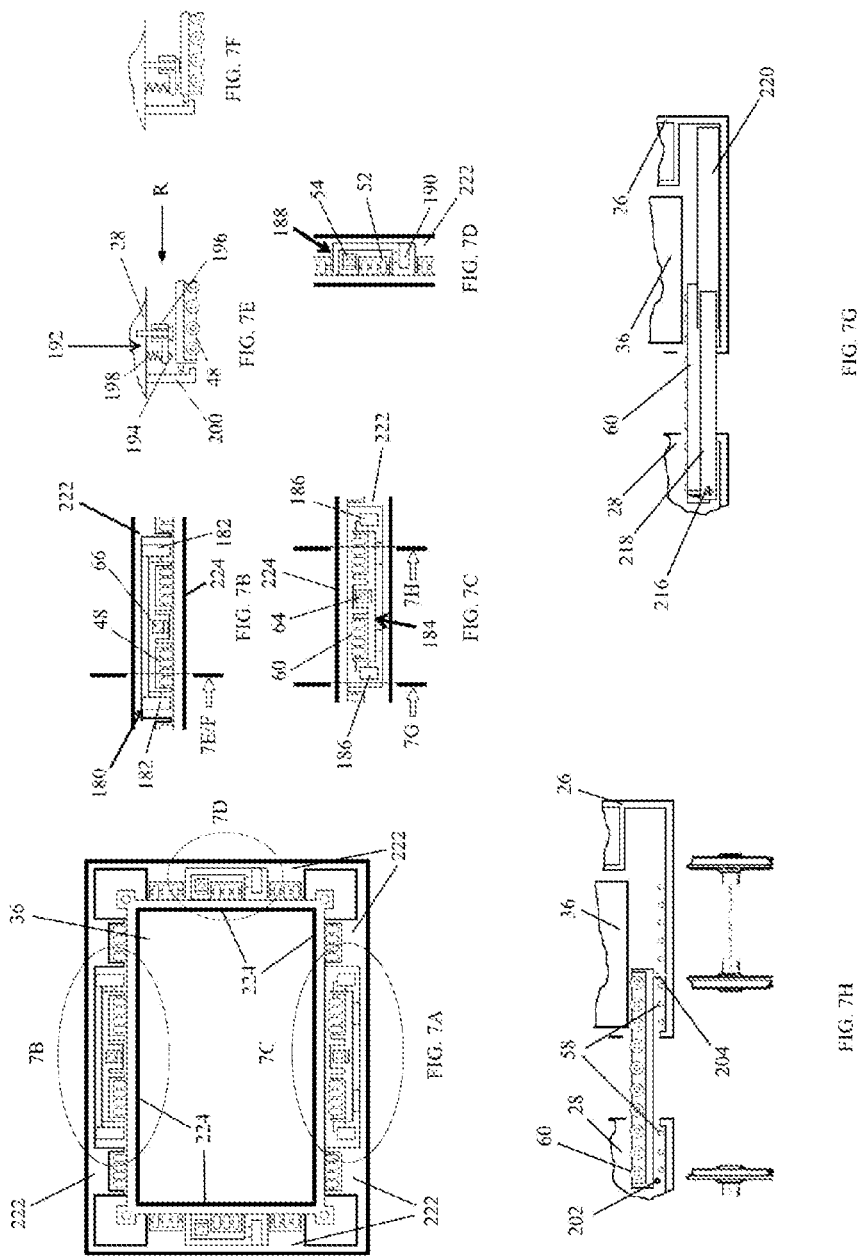

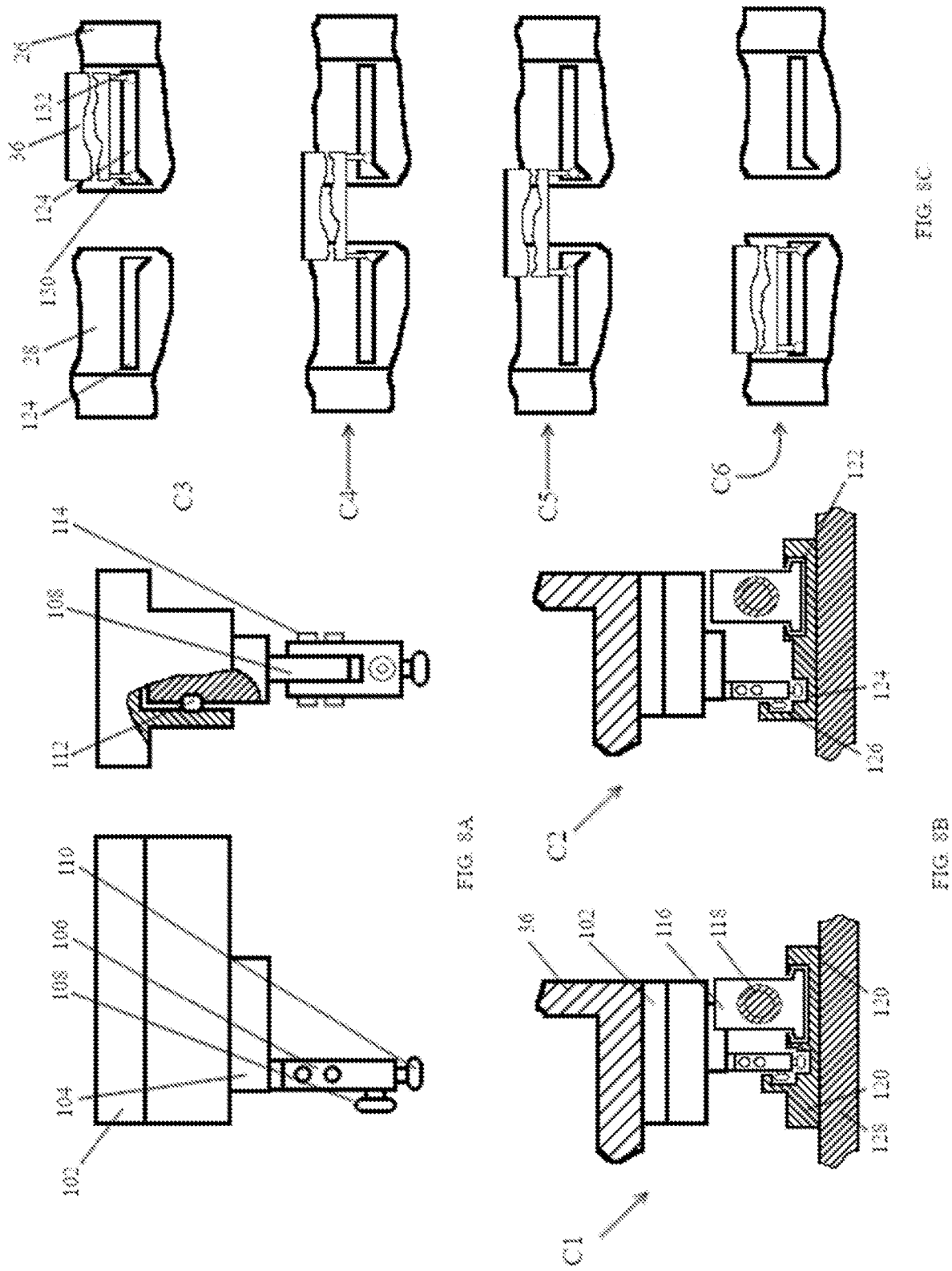

SYSTEM FOR LOADING AND UNLOADING MOVING VEHICLES

FIELD OF THE INVENTION

The present disclosure relates to methods and systems for loading and unloading moving vehicles. More particularly, the disclosure relates to methods and systems for reducing delays due to loading and unloading of passengers and luggage on mass transit type systems. Still more particularly, the present disclosure relates to systems and methods for loading and unloading passengers and luggage to and from, respectively, high-speed trains without stopping the train.

BACKGROUND

The present disclosure relates generally to high-speed rail transportation and, more particularly, to high-speed rail transportation that does not require the train to stop at each station.

High-speed rail transportation is used to quickly move large quantities of people and commodities from one location to another. However, the advantages of high-speed rail transportation are diminished when a train is required to slow to a stop at each station. For example, Amtrak's high-speed rail service, Acela Express, operates at a top speed of 150 mph (241 km/h). However, when traveling between Washington, D.C., and New York City, the Acela achieves an average speed, including stops, of only 81.7 mph (131 km/h). Thus, while the number of passengers increases with each stop, the average speed of the train decreases.

SUMMARY

The present invention is directed to a system for non-stop high-speed rail transportation having a high-speed rail car with a movable cabin, and a high-speed rail shuttle reaching a speed equivalent to that of the high-speed rail car. The system also includes a mechanical coupling between the high-speed rail car and the high-speed rail shuttle, and a transfer platform system supporting a transfer of the movable cabin from the high-speed rail car to the high-speed rail shuttle.

The present invention is directed to a method of non-stop high-speed rail transportation including operating a high-speed rail car at a high speed and a high-speed rail shuttle at a high speed alongside the high-speed rail car. The method also includes coupling the high-speed rail car to the high-speed rail shuttle, transferring a movable cabin from the high-speed rail car to the high-speed rail shuttle, and decoupling the high-speed rail car from the high-speed rail shuttle.

BRIEF DESCRIPTION OF THE DRAWINGS

FIG. 7A is a cross sectional view of a movable cabin.

FIG. 7B is a cross sectional view of a transfer platform system.

FIG. 7C is a cross sectional view of a transfer platform system.

FIG. 7D is a cross sectional view of a transfer platform actuator.

FIG. 7E is a cross sectional view of a transfer platform actuator.

FIG. 7F is a cross sectional view of a transfer platform actuator.

FIG. 7G is a cross sectional view of a transfer platform between a high-speed rail car and a high-speed rail shuttle.

FIG. 7H is a simplified cross sectional view of a transfer platform between a high-speed rail car and a high-speed rail shuttle.

FIG. 8 is a simplified cross sectional view of an embodiment of a mechanical coupling between a movable cabin and an actuator.

DETAILED DESCRIPTION

The present application, in some embodiments, relates to a system and related methods for loading and unloading passengers and luggage from high-speed trains without stopping the train. In particular, a loading shuttle may be provided that accelerates up to the speed of a passing train, secures to the passing train, makes an exchange of passengers and luggage, and then slows and returns to a station. In this manner, the high-speed train may be much more efficient in its travel times and its energy use because the much larger train can avoid starts and stops, while a much smaller shuttle may be accelerated and decelerated to load and unload passengers.

Figure 1A:
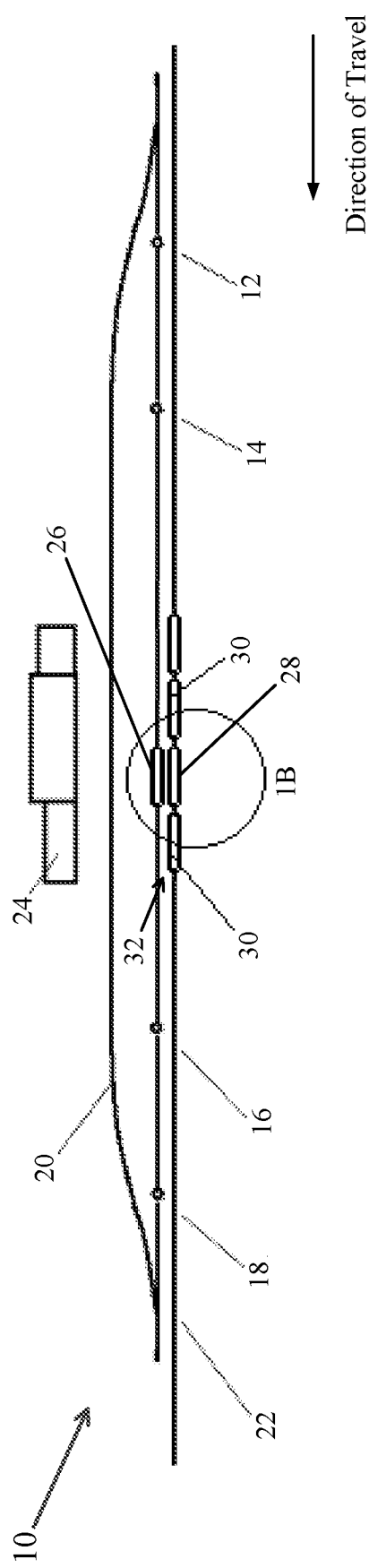
FIG. 1A is a plan view diagram of a high-speed rail transportation system.

Presented in FIG. 1A is a plan view diagram of high-speed rail transportation system 10, according to one or more embodiments. The high-speed rail transportation system 10 may include a starting point 12, cabin transfer starting point 14, cabin transfer end point 16, stopping point 18, shuttle path 20, railway segment 22, intermediate station 24, high-speed rail shuttle 26, high-speed rail car 28, regular high-speed rail car 30, and high-speed train 32. As a high-speed train 32 approaches intermediate station 24, high-speed rail shuttle 26 may leave intermediate station 24 along shuttle path 20. High-speed rail shuttle 26 may include transferable cabins (not shown in FIG. 1A) carrying cargo, such as passengers, luggage, and packages. For example, high-speed rail transportation system 10 can transport large luggage for the passengers such that passengers only need to manage their smaller luggage and can recoup their larger luggage when they reach their destination. Accordingly, the larger luggage, for example, may be separated from the passengers before or as they load the high-speed rail shuttle 26. In addition, high-speed rail transportation system 10 can also carry mail and packages for non-passengers.

As shown, high-speed rail shuttle 26 may leave starting point 12 and accelerate to meet with high-speed train 32, which may include regular high-speed rail car 30, and at least one high-speed rail car 28 (i.e., a car adapted to interact with the shuttle). High-speed train 32 may pass by intermediate station 24 without stopping and railway segment 22 may be designed to be long enough for high-speed rail shuttle 26 to accelerate to about the speed of high-speed train 32, so that when two high-speed vehicles reach cabin transfer starting point 14, the high-speed rail shuttle 26 and high-speed train 32 will have the same speed and relatively zero acceleration in relation to each other. At cabin transfer starting point 14, high-speed rail shuttle 26 can meet high-speed rail car 28 in a relative position to allow mechanical coupling (not shown in FIG. 1) between high-speed rail shuttle 26 and high-speed rail car 28. The mechanical coupling may resist relative movement of the shuttle relative to the train such that shuttle transfer may be accommodated. Mechanical coupling can occur within about one inch of the exact mechanical coupling position. The mechanical coupling system (not shown in FIG. 1) can reduce the difference from the exact mechanical coupling position to a difference that is acceptable for movable cabins to be transferred. Between cabin transfer starting point 14 and cabin transfer end point 16, cargo, including passenger cabins, luggage cabins, and the like, from high-speed rail shuttle 26, can be transferred to high-speed rail car 28, and cargo from high-speed rail car 28 can be transferred to high-speed rail shuttle 26. High-speed rail shuttle 26 can then reduce its speed after cabin transfer end point 16 and return to intermediate station 24 after stopping point 18 where passengers can claim their large luggage. The distance between cabin transfer end point 16 and stopping point 18 can be long enough for high-speed train 32 to brake in case of emergency. The above described system and method may allow some cargo from the high-speed train 32 to continue on without stopping at intermediate station 24, some cargo from high-speed train 32 can stop at intermediate station 24, and some cargo can board high-speed train 32 from intermediate station 24 using high-speed rail shuttle 26.

Figure 1B:
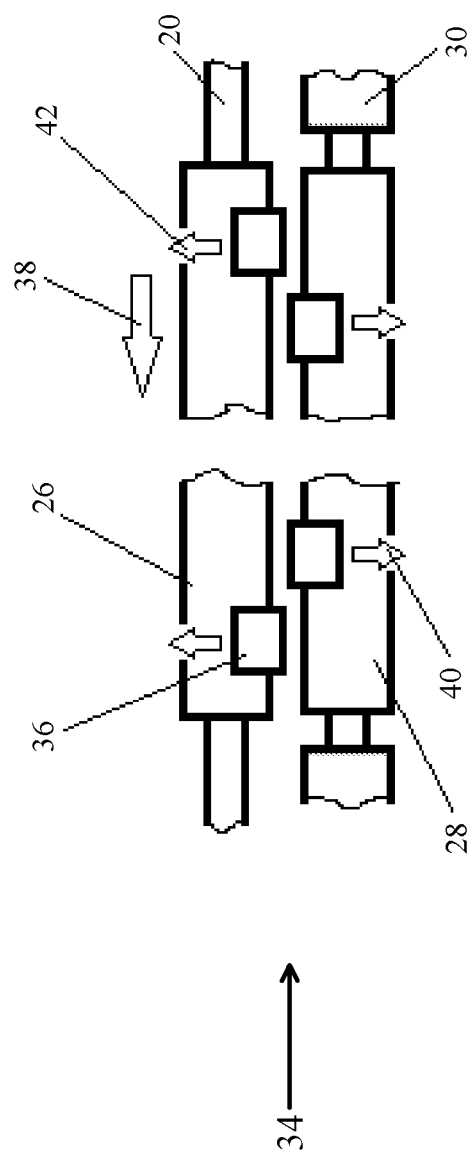
FIG. 1B is a top view diagram of a cabin transfer system.

Presented in FIG. 1B is a top view showing a closer view of one or more embodiments, of the cabin transfer system 34. The cabin transfer system 34 may include movable cabins 36, high-speed rail shuttle 26, high-speed rail car 28, regular high-speed rail car 30, shuttle path 20, travel direction 38, shuttle transfer direction 40, and rail car transfer direction 42. High-speed rail shuttle 26 runs parallel to high-speed rail car 28 along shuttle path 20. High-speed rail shuttle 26, high-speed rail car 28, and regular high-speed rail car 30 would travel at the same speed in travel direction 38 during the transfer process. As shown, cabin transfer system 34 between high-speed rail shuttle 26 and high-speed rail car 28 can be more easily accommodated with the use of movable cabins 36. Movable cabins 36 can be transferred from high-speed rail shuttle 26 to high-speed rail car 28 in shuttle transfer direction 40. Movable cabins 36 can also be transferred from high-speed rail car 28 to high-speed rail shuttle 26 in rail car transfer direction 42, such that an equal number of cabins are exchanged between the two high-speed vehicles. After movable cabins 36 are transferred in shuttle transfer direction 40, passengers and their smaller luggage can depart from movable cabins 36 and travel to a regular high-speed rail car 30 to take their seats. Larger luggage can be handled automatically and transferred from movable cabins 36 to a storage space in high-speed rail car 28 or other locations on the train. In this manner, movable cabins 36 may be emptied and ready to receive cargo from other passengers in preparation for the next transfer location.

Figure 2A:
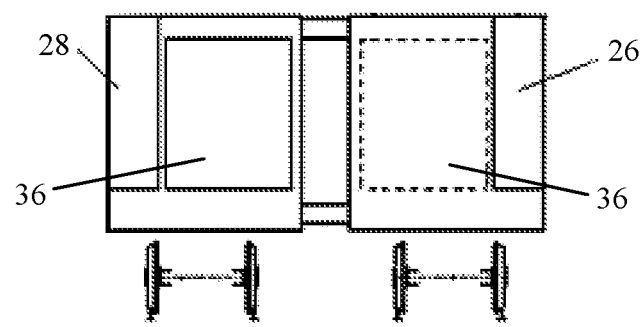
FIG. 2A is a cross sectional view of a high-speed rail car coupled to a high-speed shuttle.

Having provided an overview of the system, the particular features that allow the system to function may be discussed in more detail. In particular, the mechanical coupling system may allow the shuttle to engage and/or be engaged by the train to maintain the relative position of the shuttle relative to the train during the transfer process. FIG. 2A shows a cross sectional view of high-speed rail car 28 coupled to a high-speed rail shuttle 26, according to one or more embodiments. As mentioned above, high-speed rail car 28 may be safely and securely coupled to high-speed rail shuttle 26 by a mechanical coupling system before the movable cabins 36 are transferred. High-speed rail shuttle 26 can be coupled to high-speed rail car 28 at multiple points. After the mechanical coupling is made, movable cabins 36 can be transferred in either direction between high-speed rail shuttle 26 and high-speed rail car 28.

Figure 2B:
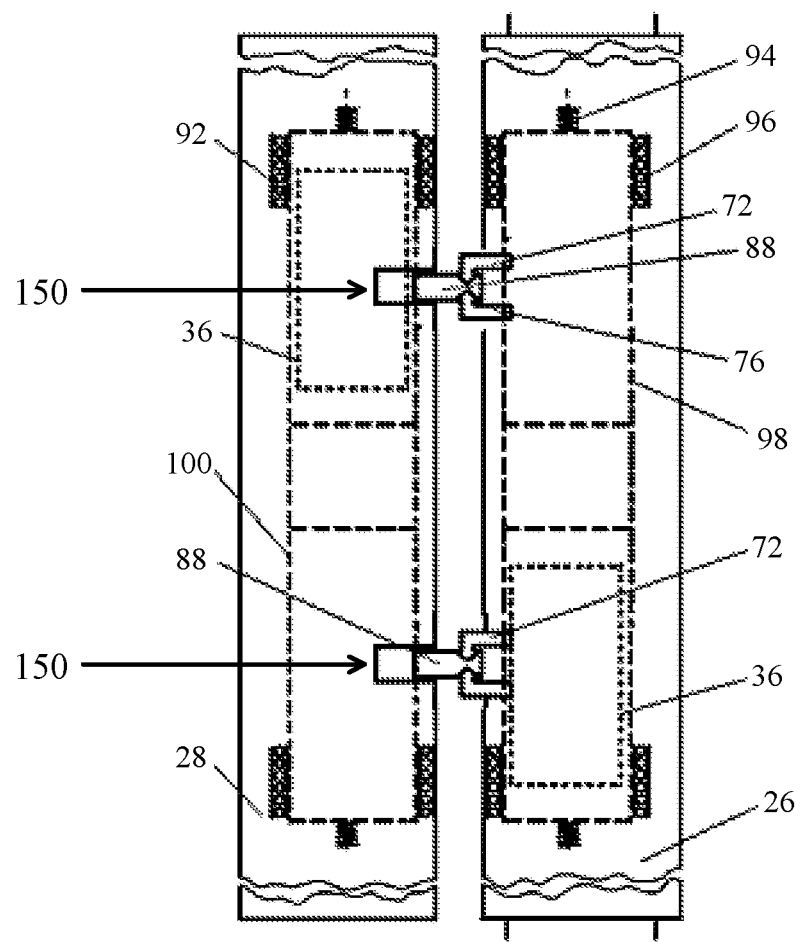
FIG. 2B is a cross sectional view of a mechanical coupling system between the high-speed rail car and the high-speed rail shuttle shown in FIG. 2A.

Presented in FIG. 2B is a cross sectional view of mechanical coupling system 150 between high-speed rail car 28 and high-speed rail shuttle 26. Mechanical coupling system 150 may be configured to secure the high-speed rail shuttle 26 relative to the high-speed rail car 28 in both longitudinal and lateral directions. Mechanical coupling system 150 includes high-speed rail car cabin platform guide 92, damper springs 94, high-speed rail shuttle cabin platform guide 96, mobile jaw 72, sliding pan 88, fixed jaw 76, high-speed rail shuttle cabin platform 98, and high-speed rail car cabin platform 100.

Fixed jaw 76, mobile jaw 72, and sliding part 88 can coordinate to couple high-speed rail car 28 to high-speed rail shuttle 26 as described in FIG. 3. In this manner, coupling the jaws with sliding part 88 can couple high-speed rail shuttle cabin platform 98 with high-speed rail car cabin platform 100. High-speed rail shuttle cabin platform 98 can be mounted in high-speed rail shuttle 26 using high-speed rail shuttle cabin platform guide 96. High-speed rail car cabin platform 100 can be mounted in high-speed rail car 28 using high-speed rail car cabin platform guide 92. Damper springs 94 can be used in connecting each platform to their respective high-speed vehicle, allowing the platforms to adjust for small distances in each high-speed vehicle's speed. In this manner, inertia acting on the moving high-speed rail car 28 and high-speed rail shuttle 26 can cause less stress on the coupling parts, which can be designed to keep the relative position of the mobile roller tracks (not shown in FIG. 2B) unchanged, so that all roller tracks can work as one guide for transferring movable cabins 36.

Presented in FIGS. 3A-D are simplified cross sectional view's of mechanical coupling 70, which includes mobile jaw 72, linear actuator 74, fixed jaw 76, positional sensor 78, first moving assembly 80, second moving assembly 82, positional reference 84, linear actuator 86, sliding part 88, and steps S1, S2, S3, and S4. In order to transfer movable cabins 36, the high-speed rail car 28 and high-speed rail shuttle 26 should be in a fixed position relative to each other. In this manner, high-speed rail car 28 and high-speed rail shuttle 26 can be coupled while both are in motion. The mechanical coupling 70 ensures the correct alignment of the cabin path between the high-speed vehicles. As the mechanical coupling 70 ensures the correct alignment of the cabin path, a mechanical coupling should be provided for each movable cabin 36. Each side of the mechanical coupling 70 would be attached to its respective cabin platforms (either high-speed rail shuttle cabin platform 98 or high-speed rail car cabin platform 100).

Fixed jaw 76 and mobile jaw 72 can be integral with high-speed rail shuttle cabin platform 98. The fixed and mobile jaw may include relatively strong arms extending outwardly from the underside of the train or shuttle. The jaws, for example, may be cast, forged, or otherwise formed steel bars. Each of the jaws may extend outwardly from the train and may include a tooth or other protrusion extending along the length of the train and toward the opposing jaw. For example, the tooth may be adapted to engage a groove on sliding part 88; the groove being designed to prevent lateral motion between the jaws and the sliding pan 88. Together with mobile jaw 72, fixed jaw 76 is configured to receive and hold sliding pan 88. The end of each jaw extending from high-speed rail shuttle 26 is beveled to motivate sliding part 88 into the jaws and prevent sliding part 88 from retreating from the jaws once the coupling is made. Mobile jaw 72 can be moved laterally towards fixed jaw 76 by using linear actuator 74.

Similar to the mobile jaw 72 and fixed jaw 76, the sliding pan may include a relatively strong arm extending outwardly from the underside of the train or shuttle. However, the sliding part 88 may be movable in a lateral direction to accommodate changing or varying lateral spaces between the high-speed rail shuttle 26 and the high-speed rail car 28 (neither shown here). While movable laterally, the sliding part 88 may be arranged in a sleeve or collar such that in its extended position it remains laterally supported, allowing the sliding part 88 to maintain its respective rail car in registered relationship with the coupled car when engaged by the jaws, for example. Sliding part 88 can be integral with high-speed rail car 28 and can move longitudinally toward high-speed rail shuttle 26 through the use of an actuator (not shown in FIG. 2B). Sliding part 88 can be blunted and notched on either side: in this manner, sliding part 88 can be gripped securely by the beveled jaws and held in place In mechanical coupling 70, first moving assembly 80 and second moving assembly 82 can be designed to couple moving objects that are both moving along the X-axis. First moving assembly 80 can be integrated into the high-speed rail shuttle cabin platform 98 (not shown in FIGS. 3A-D), and second moving assembly 82 can be integrated into the high-speed rail car cabin platform 100 (not shown in FIGS. 3A-D). Mechanical coupling 70 can be designed to couple the high-speed rail shuttle cabin platform 98 and the high-speed rail car cabin platform 100 to facilitate transfer of the movable cabins. The first moving assembly 80 can have mobile jaw 72, fixed jaw 76, and linear actuator 74. The second moving assembly 82 can have sliding part 88, linear actuator 86, and slide guide 90. Slide guide 90 can be integrated into the high-speed rail car cabin platform 100 (not shown in FIGS. 3A-D). Linear actuators 74 and 86 can be electrically powered and controlled numerically, such that all motion is synchronized to ensure safe transfer of the movable cabins. Numerical controllers (not depicted) receive position information for synchronization from positional sensor 78. Positional sensor 78 can detect a relative position against positional reference 84. Positional sensor 78 can detect if it is ahead of, behind, or in close proximity with positional reference 84.

At step S1, the high-speed rail shuttle 26 and the high-speed rail car 28 (not shown here) are moving relative to each other, and all movable platforms are stowed. At S2, the high-speed rail shuttle 26 can be provided with fine speed control, so that sliding part 88 can be brought into position between fixed jaw 76 and mobile jaw 72. The shuttle's digital control (not depicted) must make changes in shuttle's acceleration to correctly line up the sliding part 88 with the jaws. The required change in acceleration to correctly line up the mechanical coupling 70 would be calculated by the positional sensors (not depicted) along the route of the shuttle path 20 and the railway segment 22 (refer to FIG. 1A). After the positional sensors have established the position and speed of both the high-speed rail shuttle 26 and the high-speed rail car 28, the shuttle's digital speed controller would adjust the shuttle's acceleration to correctly position the mechanical coupling 70. The shuttle's digital controller may use a space-time diagram to help calculate the required acceleration. Under the optimal condition the high-speed rail car 28 moves at a constant speed. But if the high-speed rail car 28 does not move at a constant speed, the space-time diagram will be recalculated to adjust the required acceleration. Once the mechanical coupling 70 is close to its required positioning, slight positional adjustments can be made by the damper springs 94 (previously discussed in FIG. 2B). If the high-speed rail shuttle 26 is transferring more than one movable cabin 36, the high-speed rail shuttle 26 would also use the damper springs 94 to correctly adjust the position of each individual mechanical couplings 70.

Figure 3A:
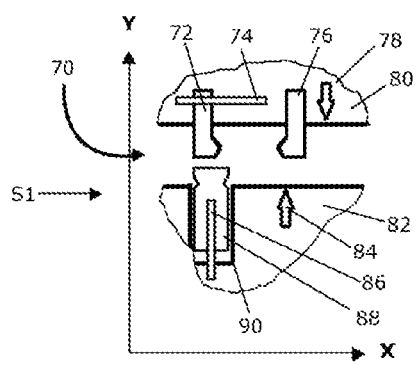
FIG. 3A is a simplified cross sectional view of a mechanical coupling.
Figure 3B:
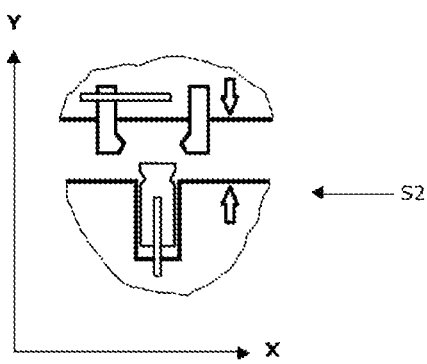
FIG. 3B is a simplified cross sectional view of a mechanical coupling.
Figure 3C:
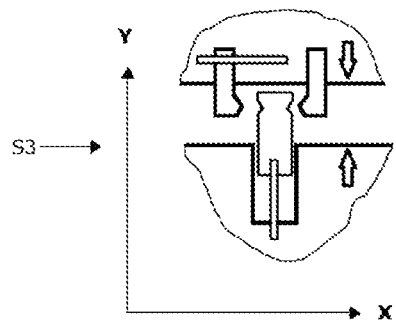
FIG. 3C is a simplified cross sectional view of a mechanical coupling.
Figure 3D:
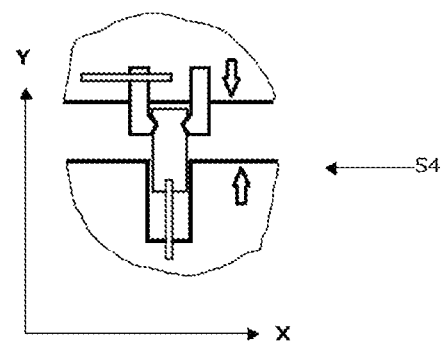
FIG. 3D is a simplified cross sectional view of a mechanical coupling.

Looking at stage S3 shown by FIG. 3C, sliding part 88 can move along the Y-axis, driven digital speed controller would adjust its space-diagram to compensate for the acceleration of the by linear actuator 86. At S4, first moving assembly 80 and second moving assembly 82 can be coupled together; mobile jaw 72 can move along the x-axis, driven by linear actuator 74. At S4, the relative position along the x-axis can be adjusted such that first moving assembly 80 and second moving assembly 82 come into contact with each other. For that, linear actuator 74 must be strong enough to guide the sliding pan 88 into the right position. This is one exemplary embodiment of a coupling assembly. Any coupling assembly used must be strong enough to adjust the positions of the high-speed rail shuttle 26 relative to the high-speed rail car 28. The coupling assemblies must also be strong enough to withstand emergencies. High-speed rail shuttle 26 movement by lateral forces from the railway axis can be compensated for by a lateral guide to prevent derailment. In this manner, the high-speed rail shuttle 26 and the high-speed rail car 28 are safely and securely joined together before movable cabins are transported between the two vehicles.

Figure 4:
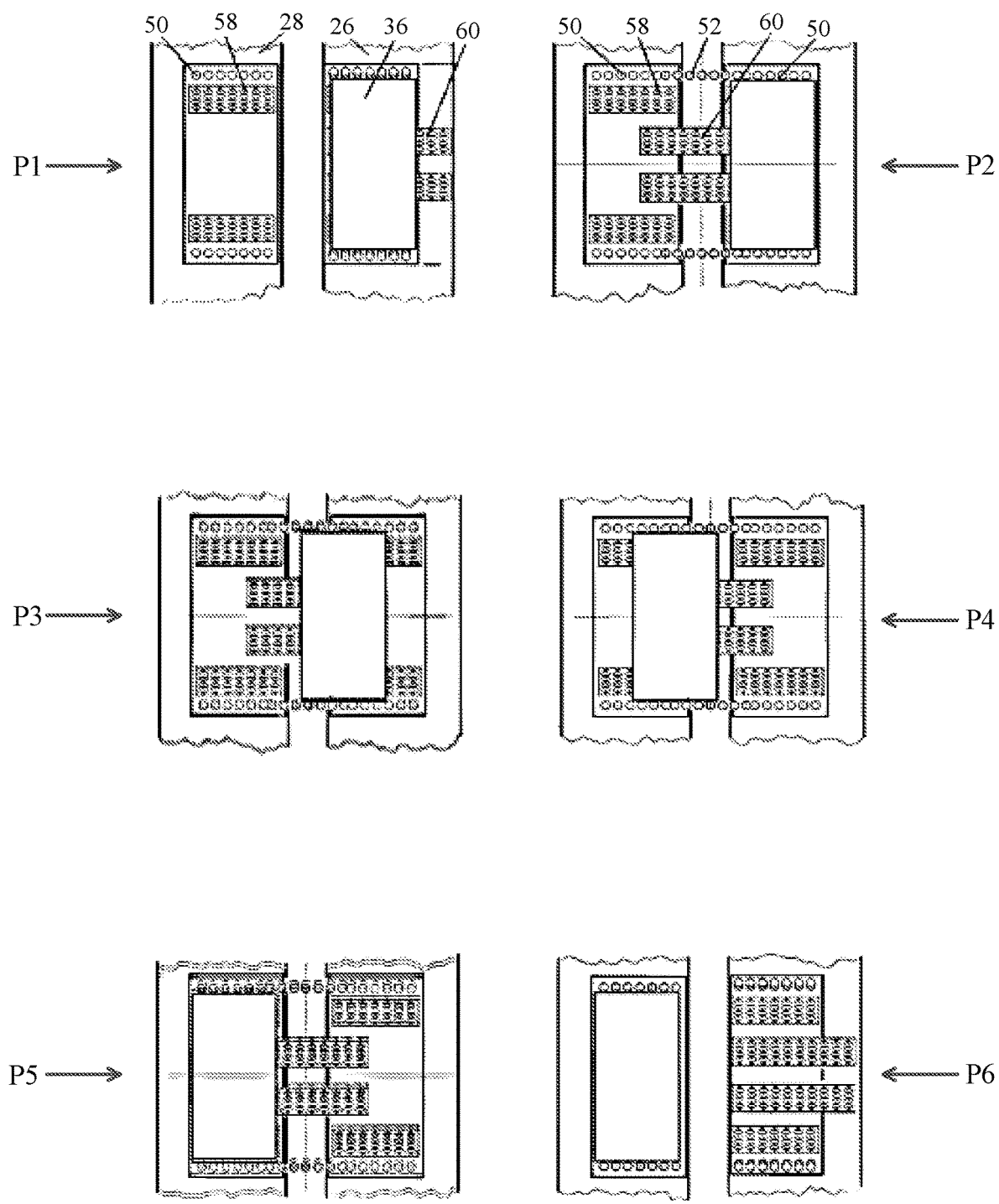
FIG. 4 is a simplified cross sectional view of a cabin transfer system.

FIG. 4 illustrates the various aspects of the cabin transfer system 34. FIG. 4 is a horizontal, cross-sectional view looking downward at the cabin transfer system 34. The cabin transfer system 34 includes the side fixed roller tracks 50, lower fixed roller tracks 58, high-speed rail car 28, high-speed rail shuttle 26, movable cabin 36, lower mobile roller track 60, side mobile roller track 52, and phases P1, P2, P3, P4, P5, and P6.

Figure 5B:
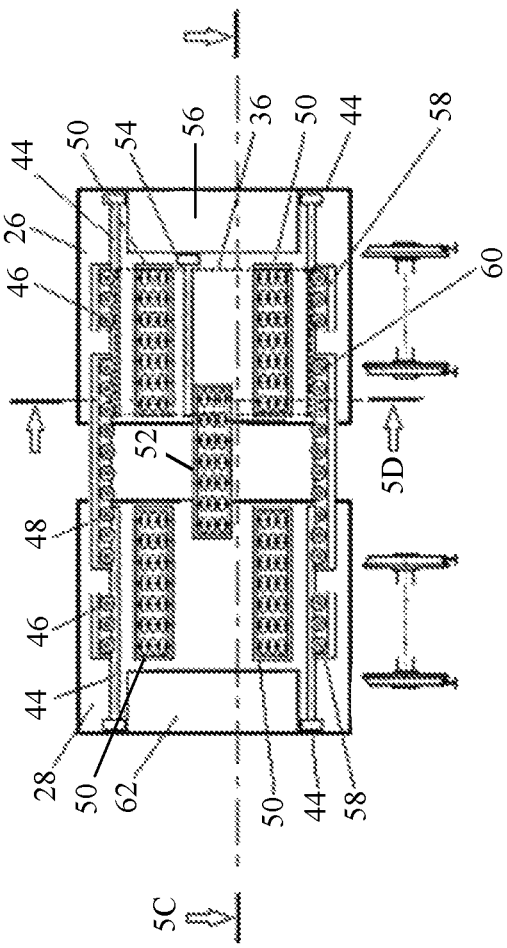
FIG. 5B is a simplified cross sectional view of a cabin transfer, system.
Figure 5A:
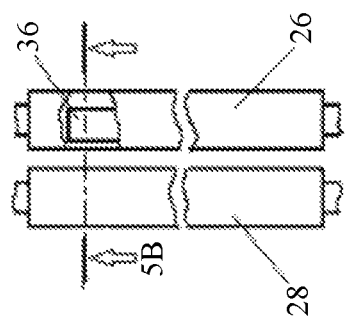
FIG. 5A is a partial cut away view of a cabin transfer system.
Figure 5D:
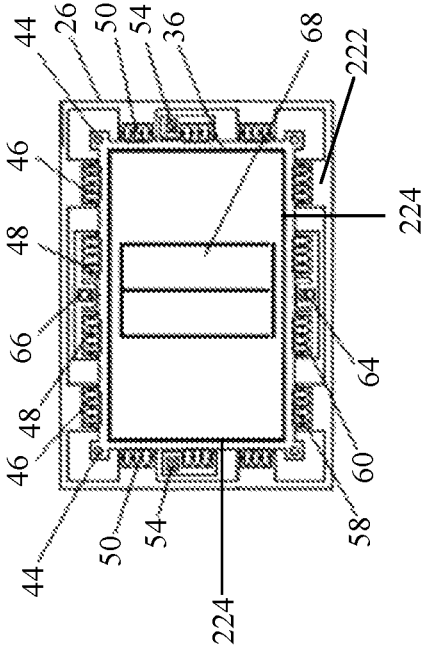
FIG. 5D is a simplified cross sectional view of a cabin transfer system.

Both high-speed vehicles (high speed rail car 28 and high-speed rail shuttle 26) may be constructed to contain a cabin support structure that surrounds the movable cabin 36, the cabin support structure for the high-speed rail shuttle 26 is depicted as cabin support structure (shown in FIG. 5D). Each high-speed vehicle's cabin support structure would be built upon that vehicle's platform (either high-speed rail shuttle cabin platform 98 or high-speed rail car platform 100) so that the platform forms the base of the cabin support structure. Both side fixed roller tracks 50 and lower fixed roller tracks 58 include a series of rollers that can be fixed within a frame, the fixed tracks would then be secured to a cabin support structure (the high-speed rail shuttle's cabin support structure 222 is depicted in FIG. 5D) within the high-speed rail car 28 or high-speed rail shuttle 26. The roller track is designed to have a plurality of rows of rollers, each row of rollers rotating about its own fixed axle. The rollers can have a substantially smooth surface to facilitate the smooth transfer of movable cabins 36.

Lower mobile roller track 60 and side mobile roller tracks 52 are configured to extend between high-speed rail car 28 and high-speed rail shuttle 26 (shown in FIG. 4). Each mobile roller track includes a series of rollers supported in a sturdy frame configured to support movable cabins 36 as they travel between high-speed rail car 28 and high-speed rail shuttle 26. This frame can include a plurality of rows of rollers, each row of rollers being supported by its own axle. The rows of rollers rotate about these axles to facilitate the smooth transfer of movable cabins 36.

Phase P1 shows high-speed rail car 28 as it travels parallel to high-speed rail shuttle 26. At phase P1, high-speed rail car 28 and high-speed rail shuttle 26 have been mechanically coupled and movable cabin 36 in the high-speed rail shuttle 26 is loaded for the transfer. The transfer process then proceeds to phase P2 by extending the mobile roller tracks (which includes lower mobile roller tracks 60, upper mobile roller tracks 48 (not shown), and side mobile roller tracks 52) from their position inside the high-speed rail shuttle 26 to a position between the two high-speed vehicles. Phases P3 and P4 show the movable cabins 36 being transferred from high-speed rail shuttle 26 to high-speed rail car 28. The transfer of movable cabins 36 would be guided by both the mobile and fixed tracks, with the fixed tracks helping to guide the movable cabin as the cabin moves into or out of one of the vehicles. Phase P5 shows the movable cabin 36 once it has been fully transferred into the high-speed rail car 28. Once the movable cabin 36 has been transferred, mobile tracks would be pulled back into high-speed rail shuttle 26, and shuttle sliding doors (not shown) would be closed. Phase P6 shows the two high-speed vehicles after the mobile transfer tracks have been retracted back into the high-speed rail shuttle 26. After phase P6 has been reached, the high-speed rail shuttle 26 and high-speed rail car 28 can be uncoupled. In this manner: the high-speed train is free to travel on to its destination, and high-speed rail shuttle is free to travel on to an intermediate station (not shown). A movable cabin may be moved from the high-speed rail car 28 to the high-speed rail shuttle 26 using similar steps as those depicted above.

Presented in FIG. 5A is a partial cut away view of cabin transfer system 34, which includes movable cabins 36, high-speed rail car 28, and high-speed rail shuttle 26. High-speed rail shuttle 26 carries movable cabins 36 for cargo transfer to and from high-speed rail car 28 using mobile roller tracks (not shown here). The parts involved in the transfer of movable cabins 36 are either in a fixed position or supported by the cabin support structure in high-speed rail shuttle 26 and high-speed rail car 28, only the high-speed rail shuttle cabin support structure 222 (shown in FIG. 5D) is described here, but the support structure for the high-speed rail car 28 would be similarly configured. In this manner, movable cabins 36 can be smoothly transferred between high-speed rail shuttle 26 and high-speed rail car 28.

Figure 11A:
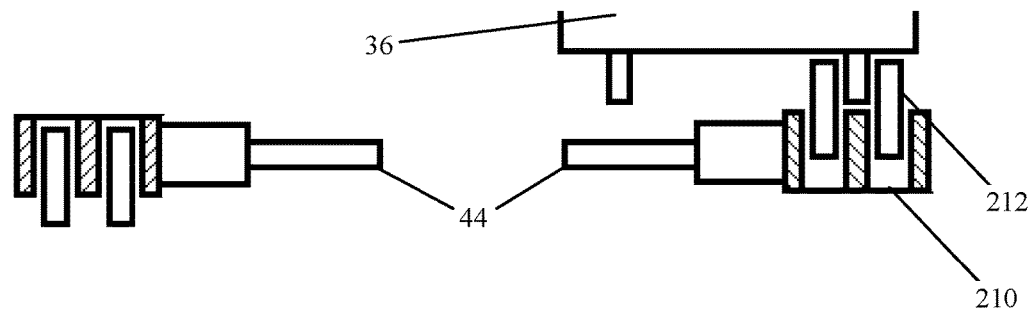
FIG. 11A-C are cross sectional views of telescopic actuator.
Figure 11B:
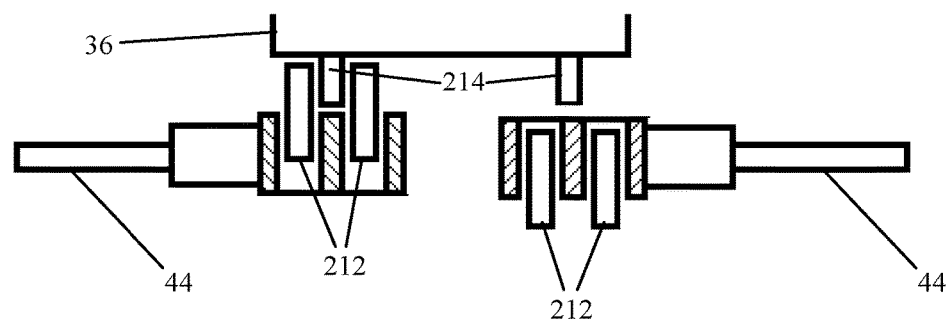
Figure 11C:
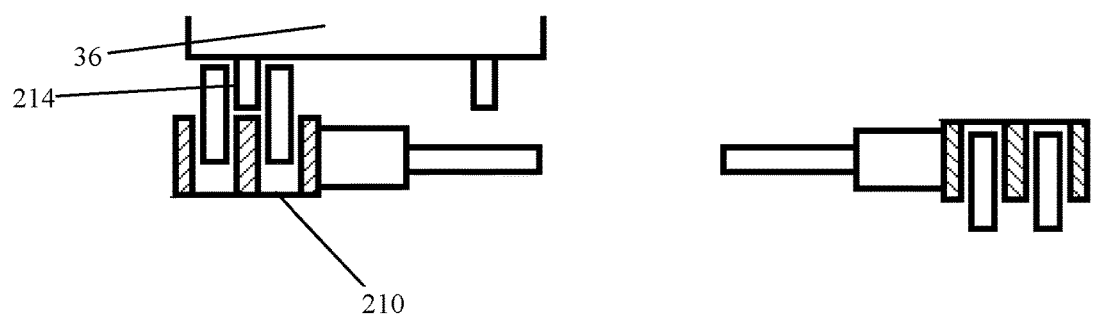

Presented in FIG. 5B is a simplified cross sectional view from the perspective of line 5B in FIG. 5A. FIG. 5B depicts the cabin transfer system 34, which includes high-speed rail car 28, cabin linear actuators 44, upper fixed roller tracks 46, upper mobile roller track 48, high-speed rail shuttle 26, side fixed roller tracks 50, side mobile roller track 52, side mobile roller track linear actuator 54, corridor to shuttle 56, movable cabins 36, lower fixed roller tracks 58, lower mobile roller track 60, and transfer car corridor 62. The motion of movable cabins 36 is guided by upper fixed roller tracks 46, upper mobile roller track 48, side fixed roller tracks 50, side mobile roller track 52, lower fixed roller tracks 58, and lower mobile roller track 60. Within high-speed rail shuttle 26 and high-speed rail car 28, the motion of movable cabins 36 is guided by upper fixed roller tracks 46, side fixed roller tracks 50, and lower fixed roller tracks 58. Between high-speed rail shuttle 26 and high-speed rail car 28, the motion of movable cabins 36 is guided by upper mobile roller track 48, side mobile roller track 52, and lower mobile roller track 60. The motion of movable cabins 36 is driven by cabin linear actuators 44 that are located within each high-speed vehicle. The cabin linear actuators 44 push the movable cabin 36 out of high-speed rail shuttle 26 and pull movable cabin 36 into high-speed rail car 28. Movable cabins 36 are transferred after upper mobile roller track 48, side mobile roller track 52, and lower mobile roller track 60 have been moved into their position between high-speed rail shuttle 26 and high-speed rail car 28. Upper mobile roller tracks 48, side mobile roller track 52, and lower mobile roller track 60 are pushed from high-speed rail shuttle 26 and pulled into high-speed rail car 28 by mobile roller track actuators (not shown in FIG. 2B). FIGS. 11A-C illustrate one design for moving the movable cabins 36 between the high-speed rail car 28 and high-speed rail shuttle 26. After movable cabins 36 are transferred between high-speed rail shuttle 26 and high-speed rail car 28, mobile roller track actuators pulled back and stored in high-speed rail shuttle 26.

Figure 5C:
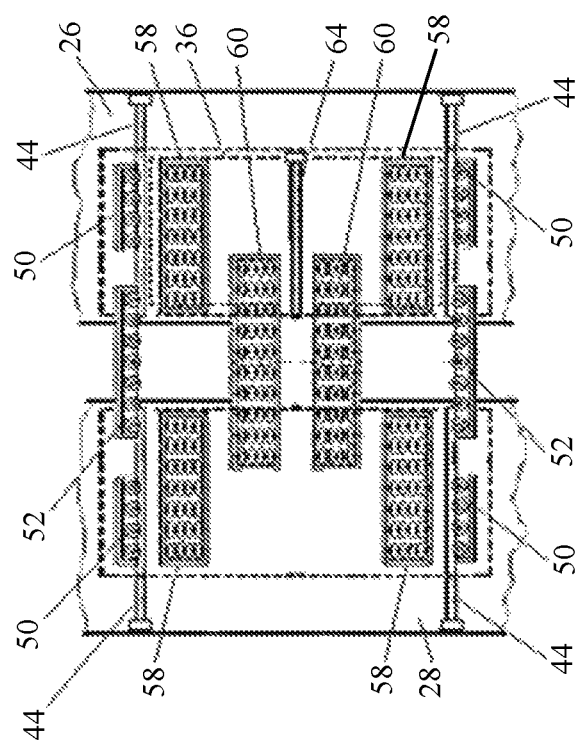
FIG. 5C is a simplified cross sectional view of a cabin transfer system.

Presented in FIG. 5C is a simplified cross sectional view of cabin transfer system 34 shown from the perspective of plane 5C in FIG. 5B. The cabin transfer system 34 includes high-speed rail car 28, cabin linear actuators 44, high-speed rail shuttle 26, side fixed roller tracks 50, side mobile roller track 52, movable cabins 36, lower fixed roller tracks 58, lower mobile roller track 60, and lower mobile roller track linear actuator 64. Lower mobile roller track linear actuator 64 pushes lower mobile roller track 60 out from high-speed rail shuttle 26 into high-speed rail car 28, and lower mobile roller track linear actuator 64 pulls lower mobile roller track 60 back from high-speed rail car 28 into high-speed rail shuttle 26 for storage.

Presented in FIG. 5D is a simplified cross sectional view of cabin transfer system 34, from the perspective of plane 5D in FIG. 5B. The main elements of FIG. 5D include cabin linear actuators 44, upper fixed roller tracks 46, upper mobile roller track 48, upper mobile track linear actuator 66, high-speed rail shuttle 26, side fixed roller tracks 50, side mobile roller track linear actuator 54, movable cabins 36, movable cabin sliding doors 68, lower fixed roller tracks 58, lower mobile roller track 60, lower mobile roller track linear actuator 64, and cabin wall 224. Upper mobile track linear actuator 66 pushes upper mobile roller track 48 out from high-speed rail shuttle 26 into high-speed rail car 28, and upper mobile track linear actuator 66 pulls upper mobile roller track 48 back from high-speed rail car 28 into high-speed rail shuttle 26 for storage. Movable cabin sliding doors 68 open to allow passage of cargo between high-speed rail shuttle 26 and the high-speed rail car 28.

Figure 6B:
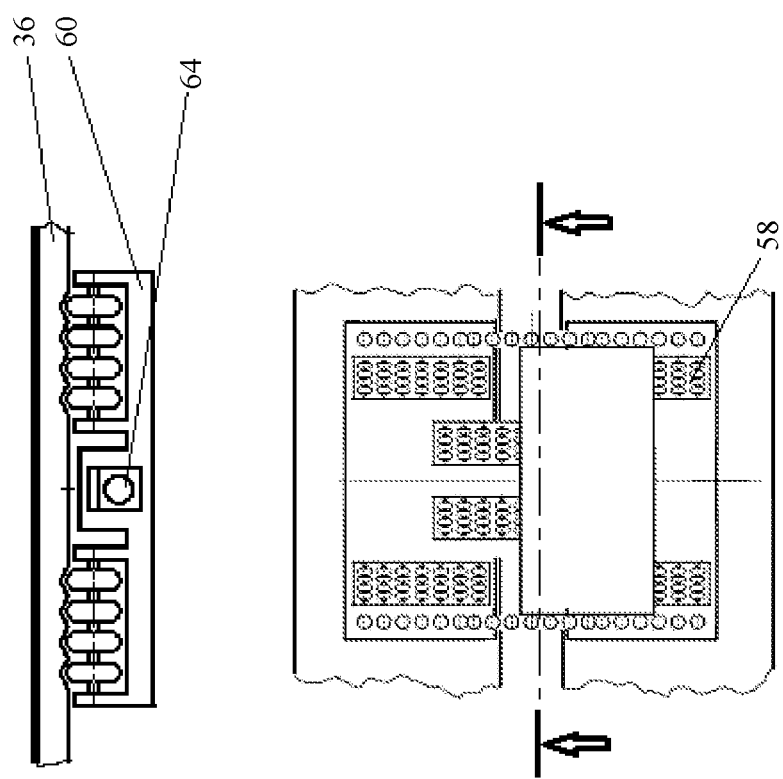
FIG. 6B is a cross sectional view of a transfer platform system.
Figure 6A:
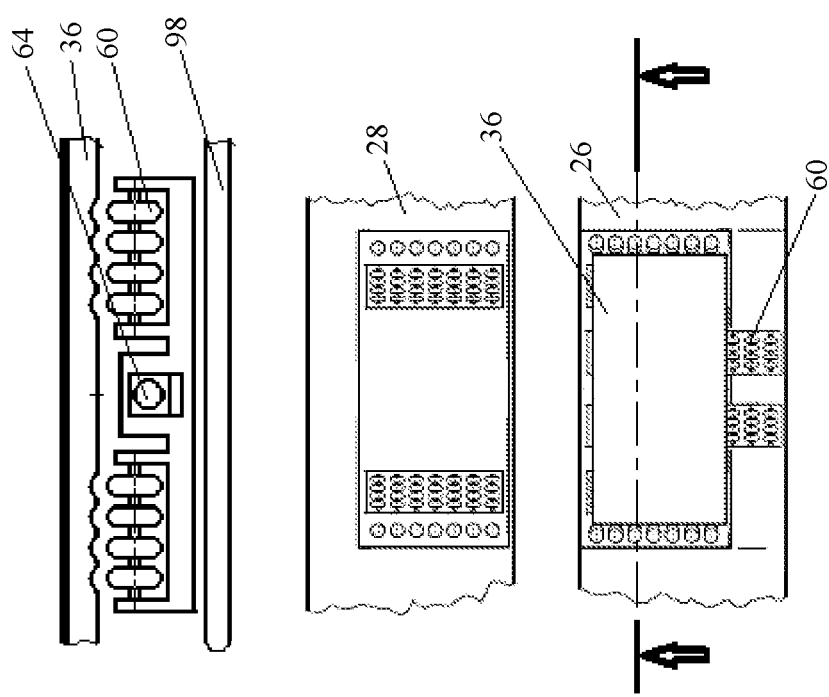
FIG. 6A is a cross sectional view of a transfer platform system.

Presented in FIGS. 6A and 6B are cross-sectional views of cabin transfer system 34, which includes lower mobile roller track linear actuator 64, movable cabin 36, lower mobile roller track 60, high-speed rail shuttle cabin platform 98, high-speed rail car 28, and movable cabin 36. In this embodiment, lower mobile roller track 60 requires two stages to be put into its transfer position between high-speed rail car 28 and high-speed rail shuttle 26. At transfer stage T1 (shown by FIG. 6A), lower mobile roller track 60 would start inside of high-speed rail shuttle 26 with the movable cabin 36 held slightly above lower mobile roller track 60 so that movable cabin 36 would not be weighing on the lower mobile roller track 60. Lower mobile roller track 60 can then be moved into its position between high-speed rail car 28 and high-speed rail shuttle 26 by lower mobile roller track linear actuator 64. Lower mobile roller track 60 would remain lower than the level of movable cabin 36 during this extension. At transfer stage T2 (shown by FIG. 6B), a second movement could vertically lower the movable cabin 36 onto the lower mobile roller track 60 and lower fixed roller tracks 58, such that the weight of the movable cabin 36 is supported by both the lower mobile roller track 60 and lower fixed roller tracks 58. During transfer stage T2, an actuator (not shown) can be provided to lower movable cabin 36. Alternatively, a hydraulic lift may be provided to raise and lower the lower fixed roller tracks 58 and lower mobile roller tracks 60 to the level required to support the movable cabin 36. The length and position of lower mobile roller track 60 can be essentially equivalent to a simply supported beam spanning the gap between high-speed rail car 28 and high-speed rail shuttle 26 (the vehicles), with support points for each vehicle inside the rectangle of support points of each vehicle. In this manner, the weight of movable cabins 36 cannot produce forces tending to overturn the vehicles.

Presented in FIG. 7A is a cross sectional view of movable cabin 36 preparing to be transferred. As explained in FIGS. 6A and 6B, the mobile roller tracks undergo two movements to prepare for transfer of movable cabin 36. At the first stage, the mobile roller tracks move horizontally from inside the high-speed rail shuttle 26 and into the high-speed rail car 28. At this stage, the mobile roller tracks are slightly spaced from the walls of movable cabin 36 by telescopic supports (not shown) to avoid force from movable cabin 36 on the roller tracks as they are being moved. At the second stage, the mobile roller tracks lower mobile roller track 60, upper mobile roller track 48, and side mobile rollers tracks 52 move toward the cabin to form, together with the fixed roller tracks, a continuous guide for cabin transfer. In this manner, the task of cabin support structure 222 in the actuators can be made easier and the telescopic supports, acting as a cantilever beam, will be subjected to less stress. The details for each type of roller track, identified by circles 7B, 7D, and 7C are examined in more detail in corresponding FIGS. 7B, 7C, and 7D. The term transfer platform system is used for elements involved in this action. There are upper transfer platform 180, lower transfer platform 184, and side transfer platform 188. The platform is extended by moving mobile roller tracks outside pushed by the actuator.

Presented in FIG. 7B-D are more detailed views of the top, bottom, and side transfer platform systems previously shown in FIG. 7A; the labeled circles in FIG. 7A identify the location of each of the different transfer platform systems shown in FIGS. 7A-D. FIG. 7B is a sectional view of the upper transfer platform 180. The upper transfer platform 180 includes the upper mobile roller track 48, upper mobile track linear actuator 66, and the upper telescopic support 182. The upper transfer platform 180 would be attached to the high-speed rail shuttle cabin support structure 222 (previously discussed in FIGS. 4 and 5). The upper mobile track linear actuator 66 pushes or retracts the upper mobile roller track 48 into the required position, while the upper mobile roller track 48 is designed to guide the movable cabin 36 during its transfer between rail cars. The upper telescopic support 182 provides support for the upper mobile roller track 48 while still allowing the upper mobile roller track 48 to move. FIG. 7C is a view of the lower transfer platform 184. The lower transfer platform 184 includes the lower mobile roller track 60, lower mobile roller track linear actuator 64, and lower telescopic support 186. The lower mobile roller track linear actuator 64 push or pull the lower mobile roller track 60 into the correct position between the high-speed rail car 28 and high-speed rail shuttle 26. The lower telescopic support 186 is designed to support the weight of the lower mobile roller track 60 while the latter is being put into position by the lower mobile roller track linear actuator 64. Once the platform is fully extended, the lower mobile roller track 60 would then be mainly supported by the lower rail car support beam 202 and lower shuttle support beam 204 (shown and explained in FIG. 7H and its accompanying description). FIG. 7D is a detailed view of the side transfer platform 188, which includes side mobile rollers tracks 52, side mobile roller track linear actuator 54, and side telescopic support 190. The side telescopic support 190 is designed to support the weight of the side mobile roller track 52 while it is being put into position by the side mobile roller track linear actuator 54. The side telescopic support 190 would be designed similarly to the lower telescopic support 186 (shown and explained in FIG. 7G and its accompanying description).

FIGS. 7E and 7F illustrate a platform receiving mechanism 192, which can be located in either the high-speed rail shuttle 26 or high-speed rail car 28; depending upon which high-speed vehicle has been designed to receive the extending mobile roller tracks. FIGS. 7E and 7F are cross-sectional views of the upper transfer platform 180 as shown by the line 7E/F in FIG. 7B. The platform receiving mechanism 192 is designed to retrieve and stabilizes the mobile roller track once it has been fully moved. The current embodiment shows a platform receiving mechanism 192 designed for the receiving the upper mobile roller tracks 48, but it could also be adopted to the lower transfer platform 184 or the side transfer platform 188 by simply rotating the mechanism. Furthermore, the current embodiment shows the platform receiving mechanism 192 inside the high-speed rail car 28, but it could also be put on the high-speed rail shuttle 26 if the high-speed rail car 28 had been designed as the vehicle to contain the extendable platforms. The main parts of the platform receiving mechanism 192 are the support beam contact point 194, platform receiver actuator 196, platform actuator biasing spring 198, and positioning limiter 200. The support beam contact point 194 would be a designated spot on an upper support beam on the rail car; this support beam would be similar to the lower rail car support beam 202 (shown in FIG. 7H), but would instead be designed for the upper transfer platform 180.

FIG. 7E shows the platform receiving mechanism 192 in the open position; the open position is designed to have enough space between the positioning limiter 200 and the support beam contact point 194 so that the upper mobile roller tracks 48 can be moved in Direction R into a position between the support beam contact point 194 and the positioning limiter 200. Once the upper mobile roller tracks 48 have been correctly positioned (shown by FIG. 7E), the platform receiving mechanism 192 can be put into the locked position (shown by FIG. 7F). The platform receiving mechanism 192 is put into the locked position by activating the platform receiver actuator 196, which expands in the upward direction to push against the top of the high-speed rail car 28. When the platform receiver actuator 196 expands upward, it will allow biasing spring 198 to push through the support beam contact point 194, to move the upper mobile roller track 48 against the cabin wall 224. On the move upper mobile roller tracks 48 was supported by upper telescopic support 182. In the transfer position, upper mobile roller tracks 48, are no longer supported by 182. For this, the positioning limiter 200 is provided. The positioning limiter 200 will not prevent pressing of upper mobile roller track 48 against cabin wall 224. Reaction force pushing upper mobile roller track 48 against the cabin wall 224 is compensated by the opposite force, between lower mobile roller track 60 and cabin wall 224, through cabin support structure 222. The upper transfer platform 180 would then be ready for the transfer of the movable cabin 36 (not shown). The upper mobile roller tracks 48 create a simple support beam by being supported at both ends (an example of how the lower mobile roller tracks are supported in this manner is shown in FIG. 7H). This only illustrates one example of how a receiving mechanism may function. For example, the given supporting point actuator could be designed using either a hydraulic actuator or a rack and pinion actuator that uses an electric motor. Alternatively, the receiving mechanism may be designed so as to allow the end of the transfer platform system to connect into a mechanical lock that engaged and/or disengaged by the use of an a analog signal. All movements are controlled and synchronized at the top level by one digital control system for both, shuttle and train.

Presented in FIGS. 7G and 7H are cross-sectional views of the lower transfer platform 184 when it is extended between the high-speed rail car 28 and high-speed rail shuttle 26. Line 7H in FIG. 7C illustrates the cross-sectional view of FIG. 7H. FIG. 7H illustrates how the lower mobile roller track 60 is supported when moved between the high-speed rail car 28 and the high-speed rail shuttle 26. When fully moved between the two vehicles, the lower mobile roller track 60 would be supported on both ends by support beams located within each high-speed vehicle, the high-speed rail car 28 would have a lower rail car support beam 202 and the high-speed rail shuttle 26 would have contain a lower shuttle support beam 204. The lower rail car support beam 202 would also require a receiving mechanism (as previously described in FIGS. 7E and 7F) that would secure and stabilize the extended lower mobile roller track 60 in position ready for transfer. Looking at FIG. 7G, the support beams should be placed slightly above inside the support perimeter of vehicle on the wheels to prevent either high-speed vehicle from tipping over.

Presented in FIG. 7G is a cross-sectional view of the lower transfer platform 184 from the perspective of line 7G of FIG. 7C. FIG. 7G illustrates a possible embodiment of how the lower telescopic support 186 may function. The purpose of the lower telescopic support 186 is to support the weight of the lower mobile roller track 60 while it is being moved towards high-speed rail car 28. The lower telescopic support 186 supports the lower mobile roller track 60 in vertical direction while still allowing the lower mobile roller track 60 to be moved by lower mobile roller track linear actuator 64 (shown in FIG. 7C) in a single horizontal direction. The lower telescopic support 186 would be constructed of the lower slide guide reel 216, the outer support slide 218, and the inner support slide 220. The outer support slide 218 would be attached to the sides of the lower mobile roller track 60. The inner support slide 220 would interact with the outer support slide 218 by using some type of linear-motion bearing system (not shown). There are typically two ways a slide can be made using a linear-motion bearing system. The first is by attaching small wheels, which run parallel to the direction the slide would move, on the outside of the inner support slide 220. These wheels would employ some type of rolling bearing, such as a ball bearing, to allow the wheels to freely rotate. These wheels would then fit into slots in outer support slide 218. The second way the slide may be constructed is to have the inner support slide 220 fit into a slot in the outer support slide 218. The inner support slide 220 and outer support slide 218 would then be separated by some type of low-friction ball, normally stainless steel, in this way the two slide then form a type of ball bearing but in a linear fashion. FIG. 7G is only an exemplary illustrations for how a slide could be created, many but many other ways could be employed if they severed the same function.

FIGS. 11A-C illustrate how the telescopic actuators 226 engage and move the movable cabin 36. The telescopic transfer mechanism shown in FIGS. 11A-C could be used to either insert or remove the movable cabin 36 into the high-speed rail car 28 (neither shown here). The telescopic actuators 226 have an engagement mechanism 210 that includes retractable sliding piece 212 that interact with the movable cabin's engagement member 214. The current figure only details the action of a single actuator, but it is recommended that the moving mechanism have at least four actuators, two on each side of the movable cabin 36, with each actuator located towards the top or bottom of the movable cart as required to best distribute the pushing force to the cabin. FIG. 11A shows the movable cabin in the first step of transferring the movable cabin 36, wherein the engagement mechanism 210 of the first actuator is engaged with the movable cabin 36. In the first step of transferring the movable cabin 36 the actuator would move the movable cabin 36 to a position in-between the high-speed rail car 28 and high-speed rail shuttle 26. Once the cabin has reached this position the second stage of the transfer process would take place.

FIG. 11B shows the second stage of transferring the movable cabin 36. The second stage would begin by having the second actuator's engagement mechanism 210 engage the movable cabin's engagement member 214 by moving the retractable sliding piece 212 into the engaged position as shown in FIG. 11B. The retractable sliding piece 212 interact with the movable cabin's engagement member 214 by having their individual teeth sandwiched in-between each other, similar to a zipper. Once the second actuator's engagement mechanism 210 was connected, the first actuator's engagement mechanism 210 would disengage by having its retractable sliding piece 212 move into a position where they are no longer engaged with movable cabin's engagement member 214; its retractable sliding piece 212 would disengage by retracting A second cabin linear actuators 44 would then pull the movable cabin 36 into the train; a position that is shown by FIG. 11C. The cabin linear actuators 44 in the current embodiment would be driven by an electric motor and an electronic digital computer. The retractable sliding piece 212 could use any method that would allow for easy engagement, such as the described interlocking teeth or a clamp that is open/closed by using an electric current. Alternatively, the engagement mechanism 210 and retractable sliding piece 212 could include any alternative mechanism that would allow for both the easy latching to the movable cabin 36 and had the strength to withstand the force used in moving the movable cabin 36. A digital device could be connected to each cabin linear actuators 44 to synchronize the transfer process. An alternative embodiment may also use a single long telescopic actuator to push or pull the movable cabin 36 the entire length between the rail cars.

FIGS. 8A-C illustrate an alternate embodiment for the engagement mechanism 210 (shown previously in FIGS. 11A-C) for attaching the cabin linear actuator 44 (not shown here) to the movable cabin 36 so that the movable cabin 36 can be moved between high-speed rail car 28 and a high-speed rail shuttle 26. The transfer actuation system includes guide support 102, coupling slider 104, positioning support 106, distance compensation roller 108, slide drive roller 110, guide 112, bolts 114, actuator slider 116, actuator screw 118, movable cabin 36, guide assembly 120, actuator guide 122, coupling roller guide 124, vertical roller guide 126, cabin platform 128, coupling assembly one 130, coupling assembly two 132, and coupling stages C1, C2, C3, C4, C5, and C6.

In one embodiment, movable cabin 36 can be moved by an actuator screw 118. The movable cabin 36 would be coupled with the actuator screw 118 by joining coupling slider 104 with actuator slider 116. Multiple coupling assemblies (coupling assembly one 130 and coupling assembly two 132) can be attached to the movable cabin 36 with guide support 102. Coupling slider 104 can move from a coupled position (shown at coupling stage C1) to an uncoupled position (shown at coupling stage C2). The coupling slider 104 moves from the uncoupled position (C2) to the coupled position (C1) when the slide drive roller 110 is forced to follow the path of the coupling roller guide 124 that slowly travels closer to the path of the actuator guide 122. The coupling slider 104 could interact with the actuator slider 116 in multiple ways; the current design allows the coupling slider 104 to slide (in the direction perpendicular to the direction the movable cabin 36 would travel) into a notch or groove in the actuator slider 116.

The guide support 102 would also include a positioning support 106 to keep the guide support 102 in the correct position relative to the actuator screw 118. The positioning support 106 would include the distance compensation roller 108 and the slide drive roller 110. The positioning rollers would be placed in channels in the guide assembly 120, which includes an actuator guide 122, coupling roller guide 124, and vertical roller guide 126. The guide assembly would be attached to the high-speed rail shuttle cabin support structure 222 (not shown here, previously discussed in FIGS. 4, 5, and 7). Actuator guide 122 prevents the actuator slider 116 from rotating with actuator screw 118. Coupling roller guide 124 would guide the path of slide drive roller 110. The path of the coupling roller guide 124 gets closer to die actuator screw 118 as it travels farther into the high-speed rail shuttle. This narrowing of the space between the actuator screw 118 and the coupling roller guide 124 forces the coupler slider 104 towards the actuator slider 116. The vertical roller guide 126 prevents the upward movement of the coupling slider 104, which then forces the movable cabin 36 into the correct vertical position within the high-speed rail shuttle cabin support structure 222 inside the high-speed rail shuttle 26. Movable cabin 36 can be moved by rotation of actuator screw 118 through a digitally controlled electric motor (not shown). Stages C3-C6 are viewing the transfer of the movable cabin 36 from above the floor of the high speed vehicles. At coupling stages C3-C6, coupling assemblies 130 and 132 move from coupling roller guide 124 of high-speed rail shuttle 26 to coupling roller guide 124 of high-speed rail car 28. Coupling assembly one 130 can be coupled with an actuator located in high-speed rail car 28, pulling the assemblies and movable cabin 36 from high-speed rail shuttle 26 into high-speed rail car 28. Actuators can be controlled digitally to start the motion of actuator screw 118 so that the actuator slider 116 is in an optimal position for coupling.

Figure 9A:
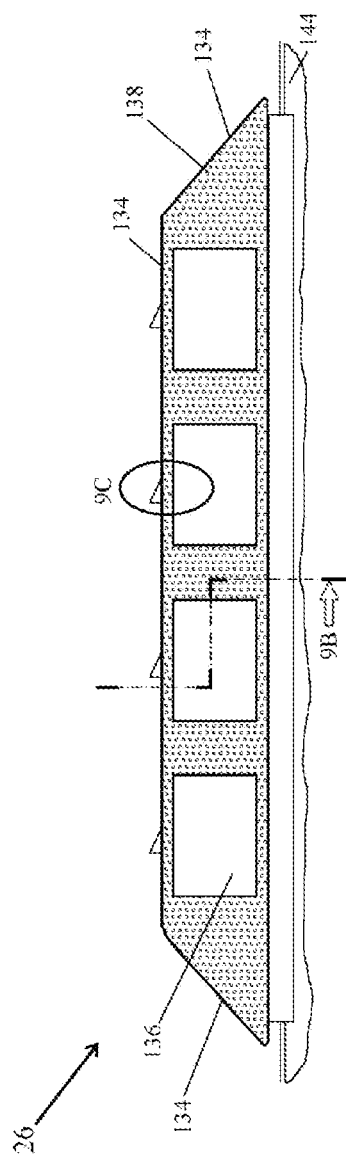
FIG. 9A is a perspective view of a high-speed rail shuttle.

FIG. 9A shows the high-speed rail shuttle 26 from outside of the vehicle, including surrounding wall 134, transfer space 136, and perforated wall 138. When two vehicles are moving parallel to each other, it creates low pressure, which causes the vehicles to be attracted to each other. In one embodiment of high-speed rail shuttle 26, perforated wall 138 forces air in between high-speed rail car and high-speed rail shuttle 26 to equalize pressure in the space between the two vehicles. The high-speed rail shuttle 26 can also be designed to allow it to control the amount of air that is being forced in-between the two high-speed vehicles. To fill the space between perforated wall 138 and inner wall 140 (shown in FIG. 9B), surrounding wall 134 can contain inflatable gaskets 135 (shown schematically in FIG. 9B and not to be construed to define size, shape, location, or orientation) to inflate after coupling between high-speed rail car 28 (not shown in FIG. 8A) and high-speed rail shuttle 26. Quick inflating can be accomplished by opening valves to a single tank with high air pressure. Quick deflating can be accomplished by another set of valves to release air used to inflate the gaskets into the open air.

Figure 9B:
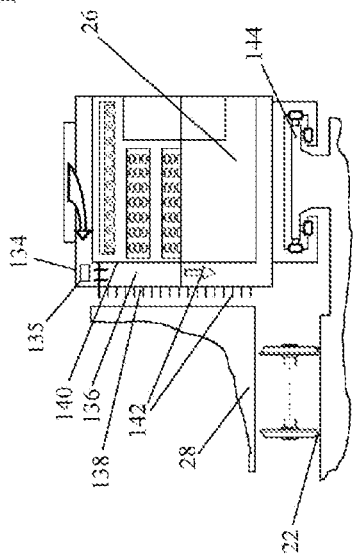
FIG. 9B is a cross sectional view of a high-speed rail shuttle.

Presented in FIG. 9B is a cross sectional view of high-speed rail shuttle 26 as shown by the line 9B in FIG. 9A. The main elements shown are the inner wall 140, air flow path 142, railway segment 22, high-speed rail car 28, and guide way 144. When high-speed rail shuttle 26 and high-speed rail car 28 are coupled, any forces perpendicular to the direction of motion can be corrected by shuttle guides. To reduce the aerodynamic effect of perpendicular forces before and after coupling, high-speed rail shuttle 26 can be provided with aerodynamic air intake structures 148 (see FIG. 9C) to create air flow path 142. Air flow path 142 fills the space in which movable cabins are being transferred, between inner walls 140 and transfer space 136. This air flow path 142 compensates for the lower air pressure that exists outside a fast moving vehicle; this compensation will reduce the suction and air turbulence in the internal spaces of the high-speed rail shuttle 26.

The close proximity of high-speed rail shuttle 26 and high-speed rail car 28 when coupled can still cause forces that attract the two vehicles to each other. In one embodiment of the invention, channels (not shown) can be provided to drive air from the top of high-speed rail shuttle 26 to the space between high-speed rail shuttle 26 and high-speed rail car 28 to adjust the pressure in that space. Another embodiment of high-speed rail shuttle can use Maglev technology in the form of magnetic and/or electromagnetic guide way. In this embodiment, linear motors could be used to propel high-speed rail shuttle 26 along guide way 144, with high-speed rail shuttle 26 being suspended by means of magnetic levitation.

Figure 9C:
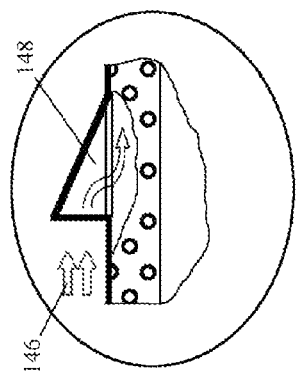
FIG. 9C is a cross sectional view of an air intake.

Presented in FIG. 9C is a cross sectional view of air intake structure 148, which receives outside air 146. Air flow is directed from air intake structure 148 toward the space between high-speed rail shuttle 26 and high-speed rail car 28 via the space between the surrounding wall and the shuttle's inner wall 140 (previously shown in FIG. 9B). Air intake structure 148 can be provided with a motor such as a servomotor, which can be digitally controlled to adjust air flow and the pressure in the space between high-speed rail shuttle 26 and high-speed rail car 28. The air flow can be adjusted to mitigate air forces due to the high speed and to reduce the noise produced during the transfer.

Figure 10A:
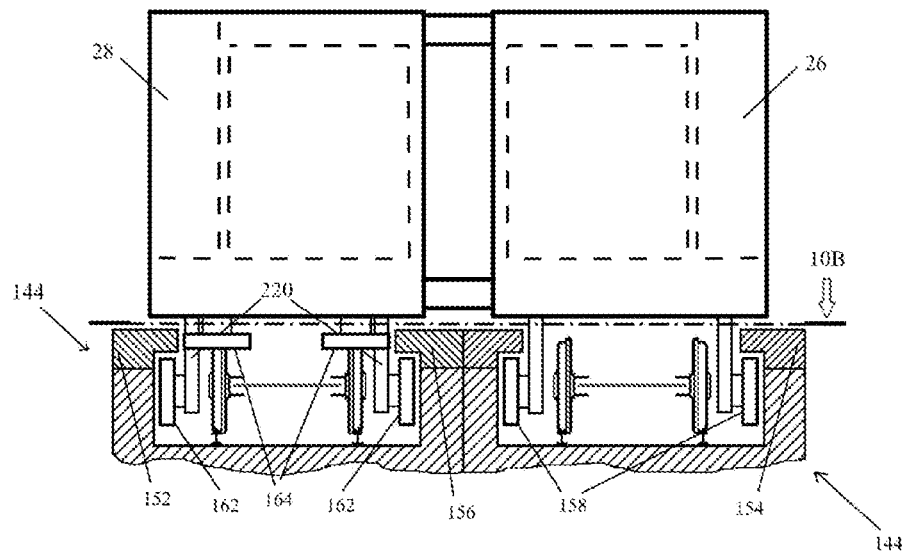
FIG. 10A is a cross sectional view of a high-speed rail car coupled to a high-speed shuttle.
Figure 10B:
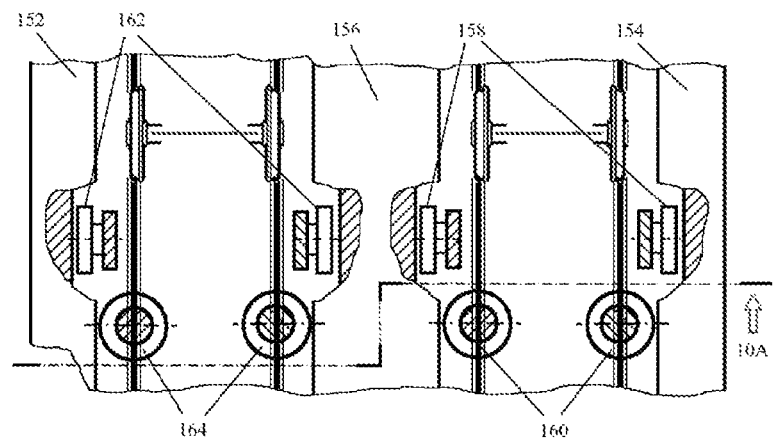
FIG. 10B is a cross sectional view of a lateral actuator.

Presented in FIGS. 10A and 10B are cross sectional views of high-speed rail car 28 coupled to high-speed rail shuttle 26 along guide way 144. The guide way 144 is a mechanical mechanism for ensuring that high-speed vehicles stay in a correct relative position during a transfer. The main elements depicted include high-speed rail car guide 152, high-speed rail shuttle guide 154, separation guide 156, horizontal shuttle rollers 160, horizontal rail car rollers 164, vertical shuttle rollers 158, vertical rail car rollers 162, and vertical arms 228. The guide way 144 provides three short walls (or guides) that are parallel to the tracks; these guides are located along the outside of the set of parallels tracks and in the space between the tracks for the high-speed rail car 28 and high-speed rail shuttle 26. These guides would normally be constructed to be slightly shorter than the height of the floors of the high-speed rail car 28 and the high-speed rail shuttle 26. The short walls also have inward facing protrusions that include high-speed rail car guide 152, high-speed rail shuttle guide 154, and separation guide 156. The guide way 144 would be designed to intrude inward of the width high-speed rail shuttle 26. To keep its aerodynamic shape, the high-speed rail shuttle 26 would also require additional outside adjustable panels or flaps (not shown) that would cover the roller mechanism when the high-speed rail shuttle 26 is not using the guide way 144.

High-speed rail car 28 and high-speed rail shuttle 26 each carries pairs of rollers on either side of their respective vehicles. The vertical rollers 158 and 162 are attached to the bottom of their respective vehicles by vertical arms 228 having axels (not shown). The vertical arms 228 are long enough to allow the attached vertical rollers 158 and 162 to rotate within high-speed rail car guide 152, high-speed rail shuttle guide 154, and separation guide 156, such that when the rollers meet the guides, the peripheral velocity of the rollers is equal to the train speed. Similarly, horizontal shuttle rollers 160 and 164 are attached beneath the high-speed vehicles; they are also attached to motors that can speed the rotational speed of the horizontal roller's to a speed equal to the speed of the high-speed vehicle. Thus, when the guides and rollers contact each other, there will be little friction to produce wear and electric shock. The rollers may also be constructed so that they do not exceed the width of the vehicle. This would prevent the rollers from needing a mechanism to retract the rollers when not in use. Additionally, steel strips (or similarly hard material) may be embedded within the guides for the rollers to run along to help protect the guides from wearing down too quickly over time.

High-speed rail car guide 152, high-speed rail shuttle guide 154, and separation guide 156 have flanges 166, and are configured to guide the sets of rollers attached to each vehicle of high-speed rail car guide 152 and high-speed rail shuttle guide 154. In this manner, derailment and/or rollover caused by forces arising due to cabin transfer can be prevented.

A lateral coupling system may be provided on the moving vehicles. In a first position S1, a position of high-speed rail shuttle 26 with high-speed shuttle cabin platform 98 and the coupling elements connecting piece, front retractable locking pin, and rear retractable locking pin is such that it is slightly advanced in relation to the high speed rail car 28 with high-speed rail cabin platform 100 and the coupling elements front retractable jaw and rear retractable jaw. In a second position, S2, the connecting piece and a rear retractable jaw are moved in position for engagement. In a third position, through controlled braking high-speed shuttle decreases speed until the connecting piece couples with the rear retractable jaw. At a fourth position, the front retractable jaw moves toward the high-speed shuttle cabin platform 98 to meet the front retractable locking pin withdrawn inside the gauge of the connecting piece. At fifth position, S5, the front retractable jaw moves further towards high-speed shuttle cabin platform 98 until the front retractable locking pin is released from the gauge of the connecting piece and the front retractable jaw couples with the front retractable locking pin at which point coupling is completed. At a sixth position, the front retractable locking pin and the rear retractable locking pin are withdrawn into gauge of connecting piece. Connecting piece slides into gauge of high-speed shuttle cabin platform 98. Front retractable jaw and rear retractable jaw slide back into gauge of high-speed rail car cabin platform 100 completing uncoupling.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed:

1. An air flow control system of a non-stop high-speed transportation system, the air flow control system comprising:
   a high-speed rail car,
   a high-speed rail shuttle, wherein the high-speed rail shuttle comprises
      a perforated wall to equalize pressure between the high-speed rail car and the high-speed rail shuttle;
      an inner wall surrounded by a surrounding wall containing an inflatable gasket,
      an air intake structure controlling air intake and air pressure, and
      a channel driving air.

2. The system of claim 1, wherein inflatable gaskets fill a space between the perforated wall and the inner wall.

3. The system of claim 1, wherein air intake structures comprising a digitally controlled motor control air flow path and air pressure in a space between the high-speed rail car and the high-speed rail shuttle.

4. The system of claim 1, wherein channels drive air into a space between the high-speed rail car and the high-speed rail shuttle adjusting pressure in that space.

\* \* \* \* \*